(12) United States Patent
Gooch et al.

(10) Patent No.: US 8,210,451 B1
(45) Date of Patent: Jul. 3, 2012

(54) SPRINKLER SYSTEM LIQUID/SOLID CHEMICAL DISPENSER

(76) Inventors: Robert K. Gooch, Thousand Oaks, CA (US); Ronald C. Weingart, Agoura, CA (US)

( * ) Notice: Subject to any disclaimer, the term of this patent is extended or adjusted under 35 U.S.C. 154(b) by 0 days.

(21) Appl. No.: 13/066,220

(22) Filed: Apr. 8, 2011

(51) Int. Cl.
 B05B 7/26 (2006.01)
 B05B 7/28 (2006.01)
 B05B 7/30 (2006.01)
 F17D 1/00 (2006.01)

(52) U.S. Cl. ........ 239/310; 239/317; 239/318; 137/268; 47/48.5

(58) Field of Classification Search ............ 239/302, 239/310, 315–318, 340, 398, 600; 137/268; 47/48.5
See application file for complete search history.

(56) References Cited

U.S. PATENT DOCUMENTS

| 2,135,969 | A | * | 11/1938 | Donaldson | 137/599.11 |
|---|---|---|---|---|---|
| 4,250,910 | A | * | 2/1981 | King | 137/268 |
| 4,846,403 | A | | 7/1989 | Mivelaz | |
| 4,898,202 | A | | 2/1990 | Craig | |
| 4,971,091 | A | | 11/1990 | Ho | |
| 5,010,912 | A | * | 4/1991 | Riding | 137/268 |
| 5,178,181 | A | | 1/1993 | Craig | |
| 5,666,987 | A | | 9/1997 | Combs | |
| 5,730,364 | A | | 3/1998 | Gertie | |
| 5,823,430 | A | * | 10/1998 | Clark et al. | 239/10 |
| 6,173,732 | B1 | | 1/2001 | Davis et al. | |
| 6,969,011 | B2 | | 11/2005 | Palmer | |
| 7,690,392 | B1 | | 4/2010 | Sarkiss | |
| 2002/0027172 | A1 | * | 3/2002 | Whiteley | 239/310 |
| 2006/0202057 | A1 | * | 9/2006 | Taggart et al. | 239/310 |

* cited by examiner

*Primary Examiner* — Darren W Gorman
(74) *Attorney, Agent, or Firm* — Albert O. Cota

(57) ABSTRACT

A chemical dispenser 10 that is attached directly to a sprinkler system which includes a reservoir 20 with an open top spout 22, a cap 26, a water inlet opening 34, a solution outlet opening 36 and a basket 38 positioned between the spout and the cap. A saddle clamp member 44 is integrally formed with the reservoir attached to a mains utility water line 46. A reservoir water inlet line 74 interfaces with the mains utility water line 46 on one end the water inlet opening of the reservoir on the other end. A solution discharge line 76, having an outlet nozzle 78, extends into the mains water inlet line and is connected through the clamp and to the reservoir. Water enters the reservoir through water inlet line and leaches a solid chemical placed within the basket to form an aqueous solution. The solution is then drawn through the discharge line by the pressure differential in the mains utility water line flow created by the restriction of the nozzle in the mains utility water line. A metering/shut-off valve 80 is connected within the solution discharge line to control fluid volume and for closure.

20 Claims, 3 Drawing Sheets

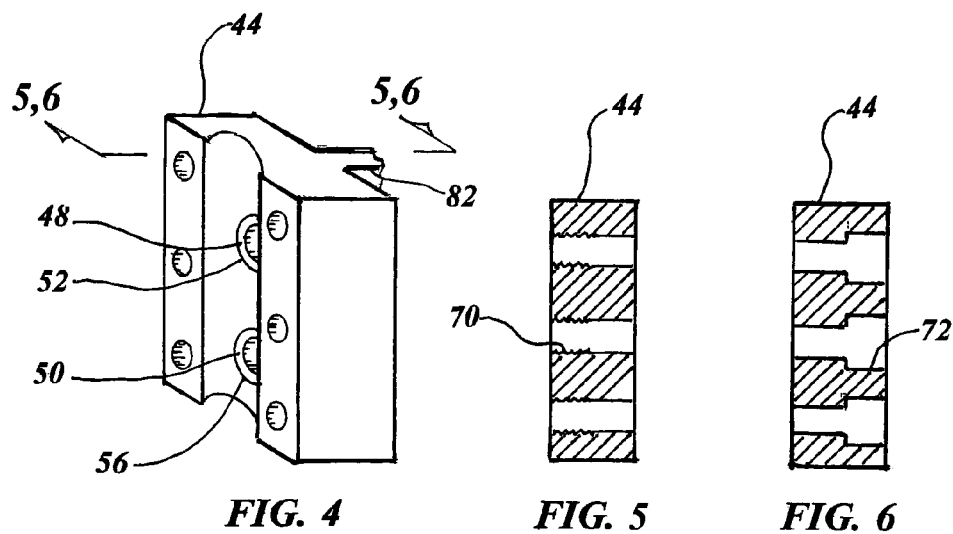
FIG. 4  FIG. 5  FIG. 6
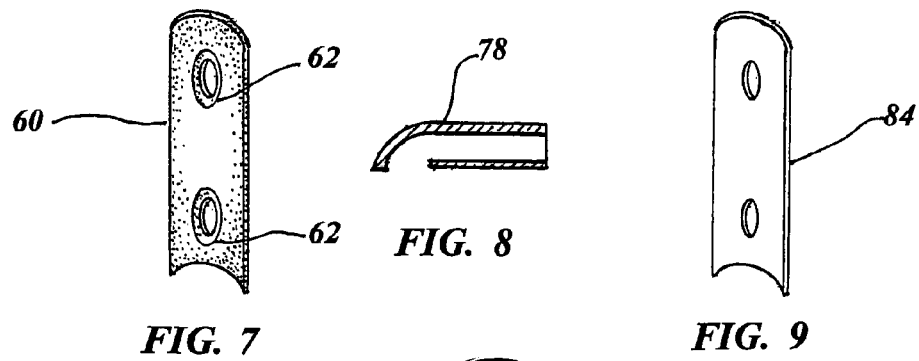
FIG. 7  FIG. 8  FIG. 9
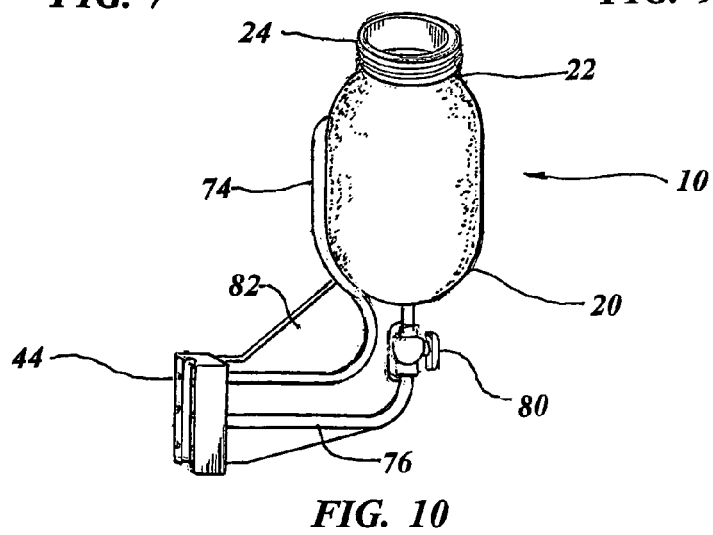
FIG. 10

SPRINKLER SYSTEM LIQUID/SOLID CHEMICAL DISPENSER

TECHNICAL FIELD

The invention generally pertains to chemical dispensers, and more specifically to a dispenser of liquid or solid irrigation or treatment chemicals for plants that are watered by a sprinkler system above or below ground level using spray heads.

BACKGROUND ART

Maintaining the healthy growth and appearance of various plants, such as vegetables, herbs, grass, shrubs, trees and flowers require that they be periodically watered. When fertilizer is used in combination with the water the health, growth and appearance of the plants is greatly enhanced. Fertilizer can be purchased as a liquid, a powder or in the form of a solid such as a tablet or pellets. The powdered fertilizer is typically spread by hand, or placed into a mechanical or electric spreader. The liquid fertilizer can be sprayed or placed into a container that is attached in-line with a watering hose. When water is flowing, the water stream causes a partial vacuum that sucks up the liquid fertilizer into the water stream.

The fertilizer tablets or pellets are typically applied by scattering them over the area surrounding the plants. After the area is watered the water causes the tablet or pellets to disintegrate, which in turn causes the chemical composition in the tablet or pellets to seep into the soil. The pellets or tablet can also be inserted into a container that is located in the path of the water stream, which causes the tablet or pellets to disintegrate into the water stream. The use of tablets or pellets has proven to be an economical, convenient and safe method for fertilizing plants.

Various designs of additive dispensers have been used to provide an effective means for dispensing water soluble chemicals such as fertilizer, insecticide, herbicide and the like in a lawn and sprinkler system. However, when compared to the instant invention, the prior art inventions are relatively complex, cumbersome to use and are not as cost effective as the instant invention.

A search of the prior art did not disclose any literature or patents that possess the novelty of the instant invention, however the following U.S. patents are considered related:

| U.S. Pat. No. | Inventor | Issue Date |
| --- | --- | --- |
| 4,846,403 | Mivelaz | Jul. 11, 1989 |
| 4,898,202 | Craig | Feb. 6, 1990 |
| 4,971,091 | Ho | Nov. 20, 1990 |
| 5,178,181 | Craig | Jan. 12, 1993 |
| 5,666,987 | Combs | Sep. 16, 1997 |
| 6,173,732 | Davis et al. | Jan. 16, 2001 |
| 7,690,392 | Sarkiss | Apr. 6, 2010 |

U.S. Pat. No. 4,846,403 issued to Mivelaz is for an automatic additive dispenser and system which includes a container attached to housing with a device to rupture a seal, thereby allowing the additive to enter a flow of water through the housing. Bottle additives are prevented from entering the system until the seal is ruptured.

U.S. Pat. No. 4,898,202 of Craig teaches an applicator for solid fertilizer that is suspended in a holder in a water pressurization chamber attached to a sprinkler line system. A diluted solution is passed into the sprinkler system for application to vegetation.

Ho in U.S. Pat. No. 4,971,091 discloses a dispenser for irrigation chemicals. The dispenser includes a vacuum breaker with two levels of valves for preventing backflow and permitting the dispensing of a chambered cartridge of chemicals into the water flow.

Craig in U.S. Pat. No. 5,178,181 teaches a fertilizer applicator that employs a container with internal inlet and outlet tubes. Water is fed through an inlet-outlet tube into the bottom of the container where a solid or liquid fertilizer is dissolved, thus forming a concentrate solution. The solution is diluted with water coming through an inlet-outlet tube, which includes a venturi, the size of which controls the flow rate.

U.S. Pat. No. 5,666,987 issued to Combs is for a device that disperses solid, powder, or a tablet of a liquid of chemicals into a pressurized liquid stream that for treats living or growing vegetation. The device includes an upright vertical cylindrical container having internal screens.

Davis, et al. in U.S. Pat. No. 6,173,732 teaches a chemical feeding system for adding liquid or water soluble solid chemicals to a lawn sprinkler system, either above or below ground level. The system has one or two vertically oriented mixing chambers containing a filter.

U.S. Pat. No. 7,690,392 issued to Sarkiss discloses a mixing body for diverting a portion of liquid into a cartridge of chemical, thereby forming an effluent that is introduced into a water flow downstream within a sprinkler system. The cartridge, which contains a liquid concentrate, is inserted into the mixing body, which as an inlet and outlet with one way valves that puncture a sealing layer of the cartridge. The effluent can be regulated by a needle valve that controls the volume.

For background purposes and as indicative of the art to which the invention is related, reference may be made to the remaining cited patents issued to Gertie in U.S. Pat. No. 5,730,364 and Palmer in U.S. Pat. No. 6,969,011.

DISCLOSURE OF THE INVENTION

Chemicals have been developed in the form of liquids and solids, for improving vegetation using fertilizers, growth regulators, controlling pests or eliminating certain unwanted plants. These chemicals include not only common fertilizers, but also hormones, herbicides, fungicides, weed killers, insecticides, soil penetrates and the like.

Application of these chemicals creates a problem in that the manufacturing and logistics require the chemicals to be concentrated and for application, the chemicals must be diluted with water to be effective without over treatment perhaps even killing the vegetation. The solution has been to add the chemical when the normal watering is taking place, such as by adding a bottle containing a liquid or solid chemical attached to a hose. When a fixed sprinkler system is used, either below or above ground, the piping arrangement must include a device to add the chemical at the time of installation.

The problem becomes more difficult when a watering system has already been installed and is in use. Prior art has developed at least three different approaches: the first includes a container for the chemical having a side entrance and a bottom exit connection, the second adds additional piping to the existing system to create a face and bypass arrangement, and the third is an in-line arrangement requiring the severing of the supply line that is adjacent to the vacuum breaker valve and adding the dispensing apparatus in line.

This long-felt problem has been solved by the instant invention which places a metallic template over the main water supply line and drilling two holes through the template with a hand drill and a standard size drill bit. The invention includes an integral half of a saddle clamp which is placed over the utility water line directly downstream of the vacuum breaker and shut-off valve of the sprinkler system. The integral clamp is fastened in place with the other half of the clamp with cap screws. A nozzle within the integral clamp enters the water line and acts as an orifice, thereby creating a venturi effect which draws a solution of mixed liquids and solids into the water supply system.

In of the above disclosure, the primary object of the invention is to provide an entire chemical dispenser that can be installed without the assistance of professional help. The only tools required to install the invention are a conventional drill motor, a single drill bit and any wrench capable of tightening hex head cap screws.

An important object of the invention is that the entire dispenser is completely self-contained, with the second half of the saddle clamp furnished and the attaching hardware included in the package.

Another object of the invention is the ease of use, as a lid may be removed and the solid chemical product in the form of granules, pellets or powder can be poured into a basket and the lid replaced. The flow-rate is adjustable using a metering/shutoff valve located directly under a reservoir.

Still another object of the invention is realized when a liquid chemical is used, as the basket can be removed and the liquid poured directly into the reservoir. If desired the basket may remain, as it is impervious to most of the chemicals used in the application.

Yet another object of the invention is its cost effectiveness, as the entire assembly including the reservoir lines and saddle clamp half may be integrally formed of thermoplastic resin using a blow molding process which allows the cost of the entire package to be well within the reach of the masses.

A final object of the invention is the ability to restore the fixed sprinkler system to its original condition by removing the chemical dispenser and covering each hole drilled in the main utility water line with a conventional worm drive hose clamp and any available resilient flat piece of rubber or thermoplastic material sized to completely cover the hole.

These and other objects and advantages of the present invention will become apparent from the subsequent detailed description of a preferred and second embodiment and the appended claims taken in conjunction with the accompanying drawings.

BRIEF DESCRIPTION OF THE DRAWINGS

FIG. 4 is a partial isometric view of the chemical dispenser saddle clamp member in the preferred embodiment.

FIG. 5 is a cross-sectional view of the saddle clamp member taken along lines 5-5 of FIG. 4.

FIG. 6 is a cross-sectional view of the saddle clamp member taken along lines 6-6 of FIG. 4.

FIG. 7 is a partial isometric view of the alternate saddle clamp gasket in the chemical dispenser preferred embodiment.

FIG. 8 is a partial isometric view of the preferred metallic downward-facing nozzle of the chemical dispenser.

FIG. 9 is a partial isometric view of the metallic saddle clamp template in the preferred embodiment.

FIG. 10 is a cross-sectional view taken along an imaginative centerline of a second embodiment of the chemical dispenser.

BEST MODE FOR CARRYING OUT THE INVENTION

Figure 1:
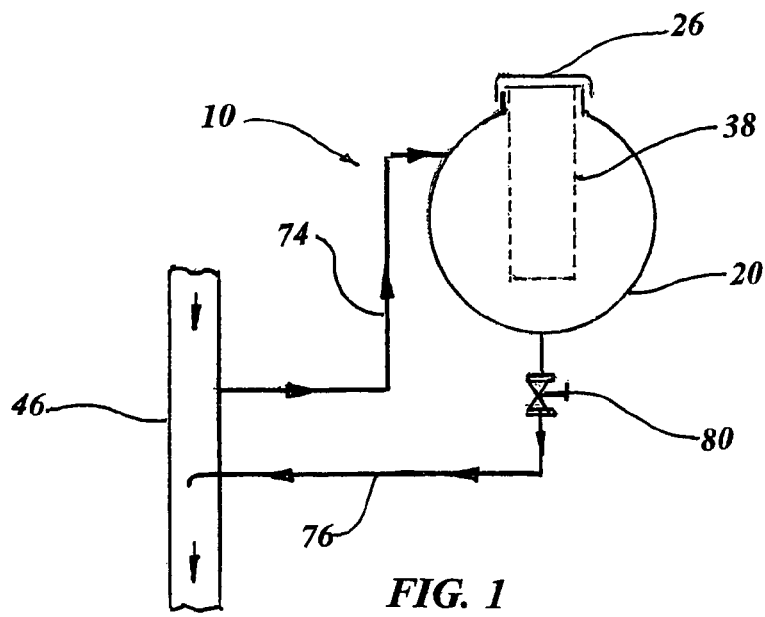
FIG. 1 is schematic diagram of the sprinkler liquid/solid chemical dispenser in the preferred embodiment.

The best mode for carrying out the invention is presented in terms that disclose a preferred and a second embodiment of a sprinkler system liquid/solid chemical dispenser 10. The preferred embodiment of the chemical dispenser 10, as shown in FIGS. 1 through 9, is comprised of a spherical shaped molded reservoir 20 having an open spout 22 with external male threads 24 on the upper surface of the reservoir 20. The reservoir 20 includes a water inlet opening 34 located intermediate between the upper surface and a middle surface of the reservoir, and a solution outlet opening 36 on a lower surface thereof, as shown in the cross-section of FIG. 2

A cap 26, having female threads 28, is removeably attached onto the open spout male threads 24. The cap 26 contains a circular groove 30 therein and an O-ring 32 is installed within the groove 30 to provide an air tight seal when joined together. Alternatively, the cap 26 may be fabricated of a transparent material which permits viewing inside the dispenser reservoir through the water to ascertain the amount of solid chemical remaining.

Figure 2:
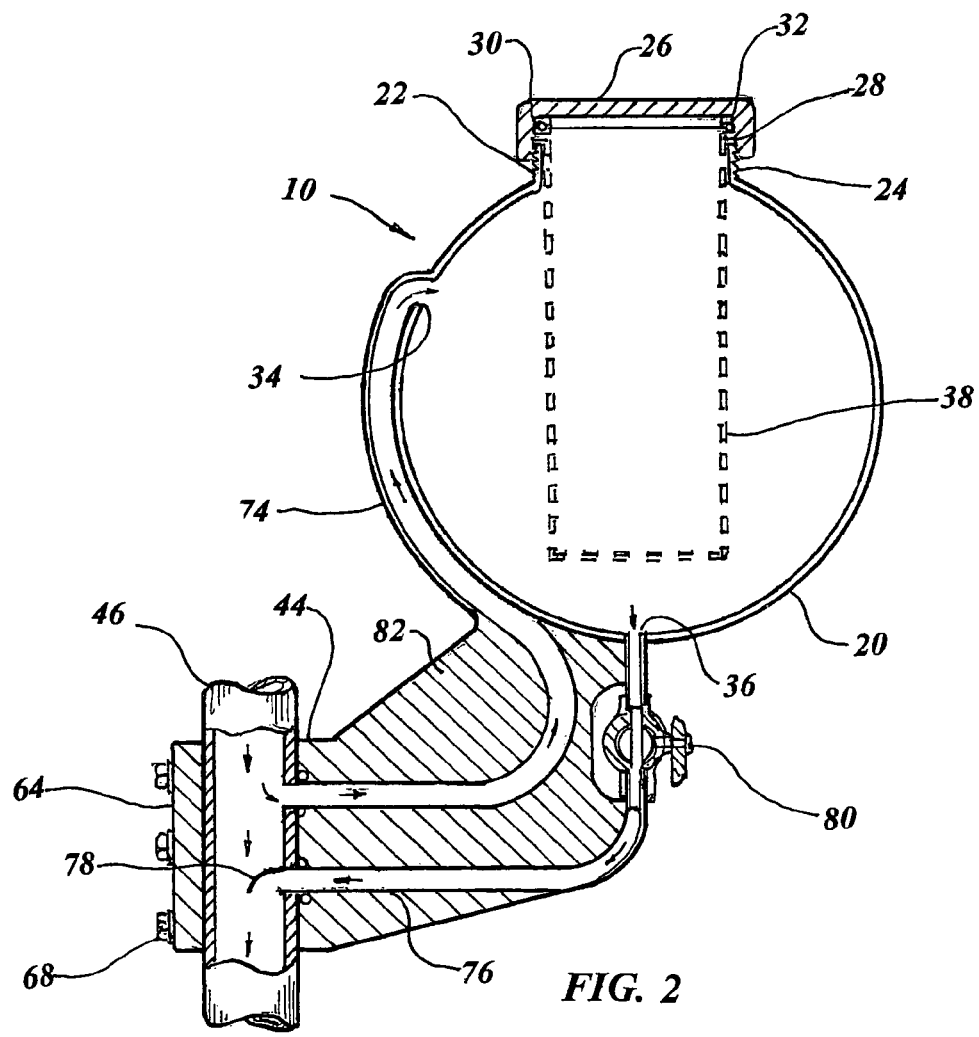
FIG. 2 is a cross-sectional view taken along an imaginative centerline of the chemical dispenser in the preferred embodiment.
Figure 3:
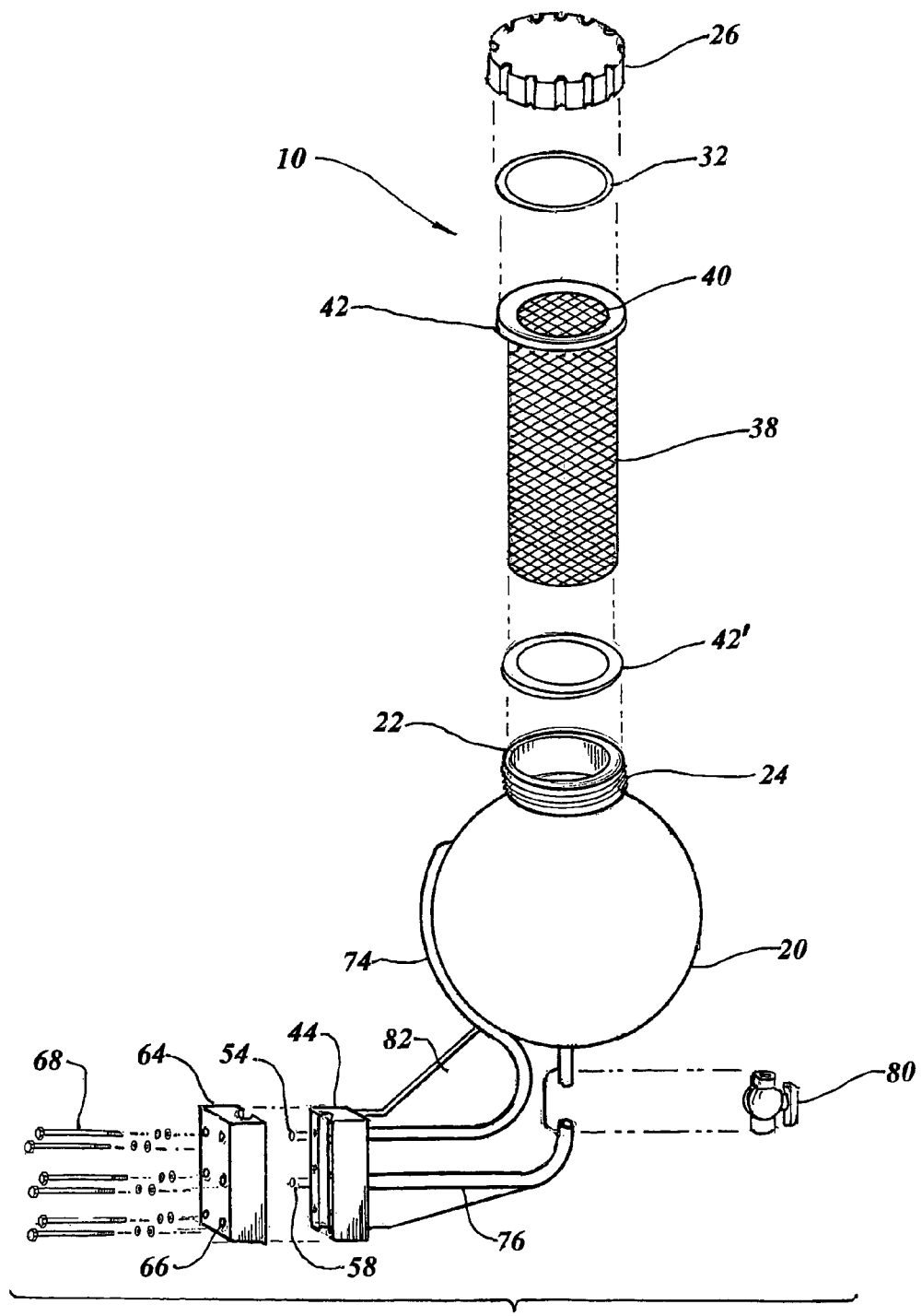
FIG. 3 is an exploded view of the chemical dispenser in the preferred embodiment.

A permeable chemical retaining basket 38 is removably disposed within the reservoir 20 between the spout 22 and the cap 26, and is configured to retain a solid chemical for application to vegetation watered by a sprinkler system. The basket 38 has an open top 40 and a rigid flange 42 on the upper surface, thereby permitting the basket 38 to be held in compression between the spout 22 and the cap 26. The basket 38 may be made of any permeable substance such as a screen mesh material, as illustrated in FIG. 3, or a perforated metal material or a perforated thermoplastic resin material, as depicted in FIG. 2. A flange gasket 42' is disposed between spout 22 and basket flange 42 to provide an air tight seal therebetween.

A saddle clamp member 44 is integrally formed with the molded reservoir 20 and is configured to be attached directly to a mains utility water line 46 of the sprinkler system. The clamp member 44 includes an upstream opening 48 and a downstream opening 50, as illustrated best in FIG. 4. The saddle clamp member 44 preferably has an upstream recessed groove 52 surrounding the upstream opening 48 and a first clamp O-ring 54 disposed within the upstream recessed groove 52. The saddle clamp member 44 also includes a downstream recessed groove 56 surrounding the downstream opening 50 and a second clamp O-ring 58 disposed within the downstream recessed groove 56 for maintaining a water tight connection when the clamp member 44 contiguously engages the mains utility water line 46. Alternatively, in place of the O-rings 54 and 58, a resilient saddle clamp gasket 60 may be used. The saddle clamp gasket 60 has a configuration with an open raised portion 62 around both the upstream opening 48 the downstream opening 55, as illustrated in FIG. 7.

A saddle clamp mating half 64 of the integral saddle clamp member 44, is depicted in FIGS. 2 and 3, which include a plurality of bores 66 for attaching the two halves together with threaded fasteners 68, as shown in FIG. 3. The integral saddle clamp member 44 preferably contains matching threaded holes 70, as illustrated in FIG. 3. As an alternate attachment method, as shown in FIG. 5, the saddle clamp member 44 may contain a plurality of fastener bores, each with a nut shaped recess 72 within the rear surface that is configured to fit and retain a hexagonal nut as part of the threaded fasteners 68.

A reservoir water inlet line 74 is integrally formed with the molded reservoir 20, with the water inlet line 74 traversing to the saddle clamp upstream opening 48 directly interfacing with the mains utility water line 46 of the sprinkler system on a first end and to the reservoir inlet 34 on a second end.

A solution discharge line 76 is also integrally formed with the molded reservoir 20, having a downward-facing outlet nozzle 78 that traverses through the saddle clamp downstream opening 50 extending directly into the mains water inlet line 46 on a first end and to the reservoir solution outlet opening 36 on the second end, as illustrated in FIG. 2. The downward-facing outlet nozzle 78 is preferably formed from a metallic material, such as stainless steel, bronze or brass, and inserted directly into the downstream opening 50 of the saddle clamp member 44. The nozzle 78 is aligned with and butted to the solution discharge line 76, however it may be alternatively formed from the same material as the reservoir 20.

A metering/shut-off valve 80 is connected within the solution discharge line 76 between the reservoir 20 and the saddle clamp member 44. The metering/shut-off valve 80 is preferably a ball valve, however a globe valve, a needle valve, a diaphragm valve or a gate valve may be used with equal ease. The metering/shut-off valve 80 obviously allows the solution of diluted water and chemical to be regulated in the amount of volume introduced into the sprinkler system as well as complete flow blockage.

A reinforcing web 82 is integrally formed with the reservoir water inlet line 74, the solution discharge line 76 and the saddle clamp member 44, producing a strengthened interface having the structural integrity sufficient to maintain the dispenser 10 cantilevered from the mains utility water line 46 of the sprinkler system. The web 82, is depicted in FIG. 3, and in the cross-section of FIG. 2, and partially displayed in FIG. 4. The web 82 is cut out to accommodate the metering/shut-off valve 80.

The spherical molded reservoir 20 and all integral portions are formed from a material such as polyethylene, polypropylene, ABS, vinyl or styrene, preferably by the blow molding process.

A metallic saddle clamp template 84 is provided for drilling holes in the sprinkler system mains utility water line 46 which allows attachment of the chemical dispenser 10.

The functional operation of the chemical dispenser 10 receives water through the mains utility line 46 through the reservoir water inlet line 74 leaching a solid chemical in the reservoir 20 to form an aqueous solution. The solution is drawn through the discharge line 76 by the pressure differential caused by the venturi effect within the sprinkler system mains utility water line 46 created by the restriction of the downward-facing outlet nozzle 78. The metering/shut-off valve 80 provides flow adjustment or complete shut-off from the chemical dispenser 10.

The second embodiment of the invention, is illustrated in FIG. 10, and includes all of the same basic elements of the preferred embodiment, however the reservoir 20, the reservoir water line 74, the solution discharge line 76 and the saddle clamp member 44 may be discrete elements having any shape and are made of any material appropriate for the application, such as metal in combination with thermoplastic resin. The reinforcing web 84 may be integrally formed, as illustrated in FIG. 10, and be separately attached to contiguous elements or completely omitted.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A sprinkler system liquid/solid chemical dispenser disposed within a sprinkler system, said dispenser comprising:
   a) a molded reservoir having an open top spout, a cap, a reservoir water inlet opening, and a reservoir solution outlet opening,
   b) a basket positioned between the spout and the cap,
   c) a saddle clamp integrally formed with the reservoir, and attached to a mains utility water line of the sprinkler system,
   d) a reservoir water inlet line that interfaces with the utility water line through the saddle clamp to the reservoir water inlet opening,
   e) a solution discharge line having an outlet nozzle extending into the mains utility water line and connected between the saddle clamp and the reservoir solution outlet opening, and
   f) a metering/shut-off valve connected within the solution discharge line, said chemical dispenser receiving water through the mains utility line to the reservoir which leaches a solid chemical from the reservoir, thereby forming an aqueous solution that is drawn through the discharge line by a pressure differential in the sprinkler system mains utility water flow created by a restriction in the utility water line from the outlet nozzle, with the metering/shut-off valve providing flow adjustment or complete shut-off from the chemical dispenser.

2. A sprinkler system liquid/solid chemical dispenser disposed within a sprinkler system, said dispenser comprising:
   a) a reservoir having an open top spout, a cap, a reservoir water inlet opening, and a reservoir solution outlet opening,
   b) a basket positioned between the spout and the cap,
   c) a saddle clamp in fluid communication with the reservoir, and attached to a mains utility water line of the sprinkler system,
   d) a reservoir water inlet line interfacing with the utility water line through the saddle clamp to the reservoir water inlet opening,
   e) a solution discharge line having a outlet nozzle extending into the mains utility water line and connected between the saddle clamp and the reservoir solution outlet opening, and
   f) a metering/shut-off valve connected within the solution discharge line, said chemical dispenser receiving water through the mains utility line to the reservoir which leaches a solid chemical from the reservoir, thereby forming an aqueous solution that is drawn through the discharge line by a pressure differential in the sprinkler system mains utility water flow created by a restriction in the utility water line from the outlet nozzle, with the metering/shut-off valve providing flow adjustment or complete shut-off from the chemical dispenser.

3. A sprinkler system liquid/solid chemical dispenser disposed within a sprinkler system which comprises:
   a) a spherical shaped molded reservoir, with said reservoir having:
      an open spout on an upper surface thereof,
      a cap removably attached onto the open spout, a reservoir inlet opening located intermediate between the upper surface and a middle surface of the reservoir, a solution outlet opening on a lower surface thereof, b) a permeable chemical retaining basket removeably disposed within the reservoir between the spout and the cap, configured to retain a solid chemical for application to vegetation watered by the sprinkler system, c) a saddle clamp member integrally formed with the molded reservoir, attached directly to a mains utility water line of the sprinkler system, said clamp having an upstream opening and a downstream opening therein, d) a reservoir water inlet line integrally formed with the molded reservoir, wherein said water inlet line traverses the saddle clamp upstream opening in fluid communication with the mains utility water line of the sprinkler system on a first end and to the reservoir inlet opening on a second end, e) a solution discharge line integrally formed with the molded reservoir, and having a downward-facing outlet nozzle traversing through the saddle clamp downstream opening and extending directly into the mains utility water line on a first end and to the solution outlet opening on the second end, and f) a metering/shut-off valve connected within the solution discharge line between the reservoir and the saddle clamp member, said chemical dispenser receiving water through the mains utility line to the reservoir which leaches the solid chemical from the reservoir, thereby forming an aqueous solution that is drawn through the discharge line by a pressure differential in the sprinkler system mains utility water flow created by a restriction in the utility water line from the downward-facing outlet nozzle, wherein the metering/shut-off valve provides flow adjustment or complete shut off from the chemical dispenser.

4. The sprinkler system liquid/solid chemical dispenser as recited in claim 3 wherein said open spout further having external male threads.

5. The sprinkler system liquid/solid chemical dispenser as recited in claim 4 wherein said cap having female threads configured to mate with said open spout male threads.

6. The sprinkler system liquid/solid chemical dispenser as recited in claim 3 wherein said cap further having a circular groove therein and an O-ring disposed within the groove for sealing against said permeable chemical retaining basket.

7. The sprinkler system liquid/solid chemical dispenser as recited in claim 3 wherein said cap is transparent which permits viewing inside the dispenser reservoir through the water inside to ascertain the level of chemical remaining within the basket.

8. The sprinkler system liquid/solid chemical dispenser as recited in claim 3 further comprises a basket flange gasket disposed between the spout and the basket for providing an air tight seal therebetween.

9. The sprinkler system liquid/solid chemical dispenser as recited in claim 3 wherein said basket further comprises an open top with a rigid flange defining an open top surface, thereby permitting the basket to be held in compression between the spout and the cap.

10. The sprinkler system liquid/solid chemical dispenser as recited in claim 3 wherein said basket further comprises a screen mesh material.

11. The sprinkler system liquid/solid chemical dispenser as recited in claim 3 wherein said basket further comprises a perforated metal material.

12. The sprinkler system liquid/solid chemical dispenser as recited in claim 3 wherein said basket further comprises a perforated thermoplastic resin material.

13. The sprinkler system liquid/solid chemical dispenser as recited in claim 3 wherein said saddle clamp member further having a upstream recessed groove surrounding said upstream opening and a first clamp O-ring disposed within the upstream recessed groove, wherein said saddle clamp member also having a downstream recessed groove surrounding said downstream opening and a second clamp O-ring disposed within the downstream recessed groove for maintaining a water tight connection therebetween.

14. The sprinkler system liquid/solid chemical dispenser as recited in claim 3 further comprising a resilient saddle clamp gasket having a configuration with an open raised portion around said upstream opening and an open raised portion around said downstream opening.

15. The sprinkler system liquid/solid chemical dispenser as recited in claim 3 wherein said saddle clamp member having a plurality of fastener bores each with a nut shaped recess.

16. The sprinkler system liquid/solid chemical dispenser as recited in claim 3 wherein said spherical molded reservoir further comprising a reinforcing web integrally formed with said reservoir water inlet line, said solution discharge line and said saddle clamp member, thereby forming a strengthened interface having the structural integrity to maintain the dispenser cantilevered from the mains utility water line of the sprinkler system.

17. The sprinkler system liquid/solid chemical dispenser as recited in claim 3 wherein said downward-facing outlet nozzle is formed from a material selected from the group consisting of stainless steel, bronze and brass.

18. The sprinkler system liquid/solid chemical dispenser as recited in claim 16 wherein said spherical shaped molded reservoir, along with all integral portions of the reservoir, are formed from a material selected from the group consisting of polyethylene, polypropylene, ABS, vinyl and styrene.

19. The sprinkler system liquid/solid chemical dispenser as recited in claim 3 wherein said metering/shut-off valve is selected from the group consisting of a ball valve, a globe valve, a needle valve, a diaphragm valve and a gate valve.

20. The sprinkler system liquid/solid chemical dispenser as recited in claim 3 further comprising a metallic saddle clamp template for drilling holes in the sprinkler system mains utility water line for attachment of the chemical dispenser.

* * * * *